US009253056B2

United States Patent
Celi, Jr. et al.

(10) Patent No.: US 9,253,056 B2
(45) Date of Patent: *Feb. 2, 2016

(54) SYSTEM TO ENHANCE PERFORMANCE, THROUGHPUT AND RELIABILITY OF AN EXISTING CLOUD OFFERING

(71) Applicant: International Business Machines Corporation, Armonk, NY (US)

(72) Inventors: Joseph Celi, Jr., Palm Beach, FL (US); Bharat B. Purohit, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/485,722

(22) Filed: Sep. 13, 2014

(65) Prior Publication Data

US 2015/0046583 A1 Feb. 12, 2015

Related U.S. Application Data

(63) Continuation of application No. 13/964,848, filed on Aug. 12, 2013.

(51) Int. Cl.
 *G06F 15/16* (2006.01)
 *H04L 12/26* (2006.01)
 *H04L 12/24* (2006.01)

(52) U.S. Cl.
 CPC ............ *H04L 43/04* (2013.01); *H04L 41/5006* (2013.01); *H04L 41/5009* (2013.01); *H04L 41/5051* (2013.01)

(58) Field of Classification Search
 CPC ............ H04L 41/5006; H04L 41/5009; H04L 41/5051; H04L 43/04
 USPC .......................... 709/217, 220, 224; 705/7.26
 See application file for complete search history.

(56) References Cited

U.S. PATENT DOCUMENTS

| 8,396,989 | B2 | 3/2013 | Chaturvedi et al. | |
|---|---|---|---|---|
| 2012/0054368 | A1 | 3/2012 | Brown et al. | |
| 2012/0278464 | A1 | 11/2012 | Lehane et al. | |
| 2012/0330711 | A1* | 12/2012 | Jain | G06Q 30/04 709/224 |
| 2012/0331113 | A1* | 12/2012 | Jain | G06F 9/5072 709/220 |
| 2013/0013462 | A1 | 1/2013 | Deng et al. | |
| 2013/0080623 | A1* | 3/2013 | Thireault | G06F 9/5027 709/224 |
| 2014/0200947 | A1* | 7/2014 | Gujar | G06Q 30/0631 705/7.26 |
| 2014/0258446 | A1* | 9/2014 | Bursell | G06F 15/177 709/217 |

OTHER PUBLICATIONS

Mell, P., et al., "Draft NIST Working Definition of Cloud Computing", Oct. 7, 2009.

* cited by examiner

*Primary Examiner* — Quang N Nguyen
(74) *Attorney, Agent, or Firm* — North Shore Patents, P.C.; Michele Liu Baillie (57) ABSTRACT

In for enhancing performance of applications, a cloud application programming interface (API) abstraction layer receives a request from an application of a given entity for core services shared among a plurality of entities. A requestor of the request is determined, and the performance level information for the requestor is determined based on entity specific performance rules defined by the given entity. The entity specific performance rules defined by the given entity are applied to requests from the application of the given entity and are not applied to requests from the other entities of the plurality of entities. The performance level information is included in the request. The request is routed for servicing by one or more of the core services using the performance level information in the request without affecting servicing of requests from other entities of the plurality of entities.

5 Claims, 7 Drawing Sheets

SYSTEM TO ENHANCE PERFORMANCE, THROUGHPUT AND RELIABILITY OF AN EXISTING CLOUD OFFERING

BACKGROUND

Many cloud offerings provide core services via application programming interfaces (APIs). These core services abstract the user interface from details of the underlying database operations, Lightweight Directory Access Protocol (LDAP) interaction, business logic, etc. The core services typically reside on a dedicated server, which can be replicated to spread incoming requests across systems to improve performance and throughput. These cloud offerings can also be extended to allow third party entities to utilize the system via an API abstraction layer. The API abstraction layer provides a means for the third party entities to utilize the core services to build a unique solution for their customers.

Challenges for such a system include dealing with growth and ensuring sufficient performance and load balancing. For example, each of the following will change the demands of the underlying system: growing number of third party entities utilizing the core services; growing number of customers or users accessing the system; and growing level of functionality and complexity of the system as it evolves. One can continue to expand the underlying hardware to address the growth factors above. However, this approach fails to inject real intelligence to the above system.

SUMMARY

According to one embodiment of the present invention, in a method for enhancing performance of applications, a cloud application programming interface (API) abstraction layer for core services shared among a plurality of entities receives a request from an application of a given entity. A computing processor determines a requestor of the request, determines performance level information for the requestor based on entity specific performance rules defined by the given entity, and includes the performance level information in the request by the computing processor, where the request is routed for servicing by one or more of the core services using the performance level information in the request without affecting servicing of requests from other entities of the plurality of entities.

In one aspect of the present invention, a user role assigned to the requestor is determined, the performance level assigned to the user role according to the entity specific performance rules defined by the given entity is determined.

In one aspect of the present invention, the user role assigned to the requestor and a current time is determined, and the performance level assigned to the user role during the current time according to the entity specific performance rules defined by the given entity is determined.

In one aspect of the present invention, the entity specific performance rules defined by the given entity are applied to requests from the application of the given entity and are not applied to requests from the other entities of the plurality of entities.

In one aspect of the present invention, each entity of the plurality of entities is associated with a priority level, where the given entity is associated with a higher priority than another entity of the plurality of entities, and where the request from the application of the given entity is processed before processing any requests from the other entity.

In one aspect of the present invention, the method further receives a plurality of requests from a plurality of users of the application of the given entity, determines the requestor of each request, determines the performance level information for the requestor of each request based on the entity specific performance rules defined by the given entity, and includes the performance level information for the requestor in each request, where the plurality of requests is routed for servicing by one or more of the core services in an order consistent with the performance level information in the plurality of requests, without affecting servicing of requests from other entities of the plurality of entities.

In one aspect of the present invention, the method further receives a plurality of requests from a plurality of users of a plurality of applications of the given entity, determines the requestor and the application of each request, determines the performance level information for the requestor and the application of each request based on the entity specific performance rules defined by the given entity, and includes the performance level information for the requestor and the application in each request. The plurality of requests is routed for servicing by one or more of the core services in an order consistent with the performance level information in the plurality of requests, without affecting servicing of requests from other entities of the plurality of entities.

System and computer program products corresponding to the above-summarized methods are also described and claimed herein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
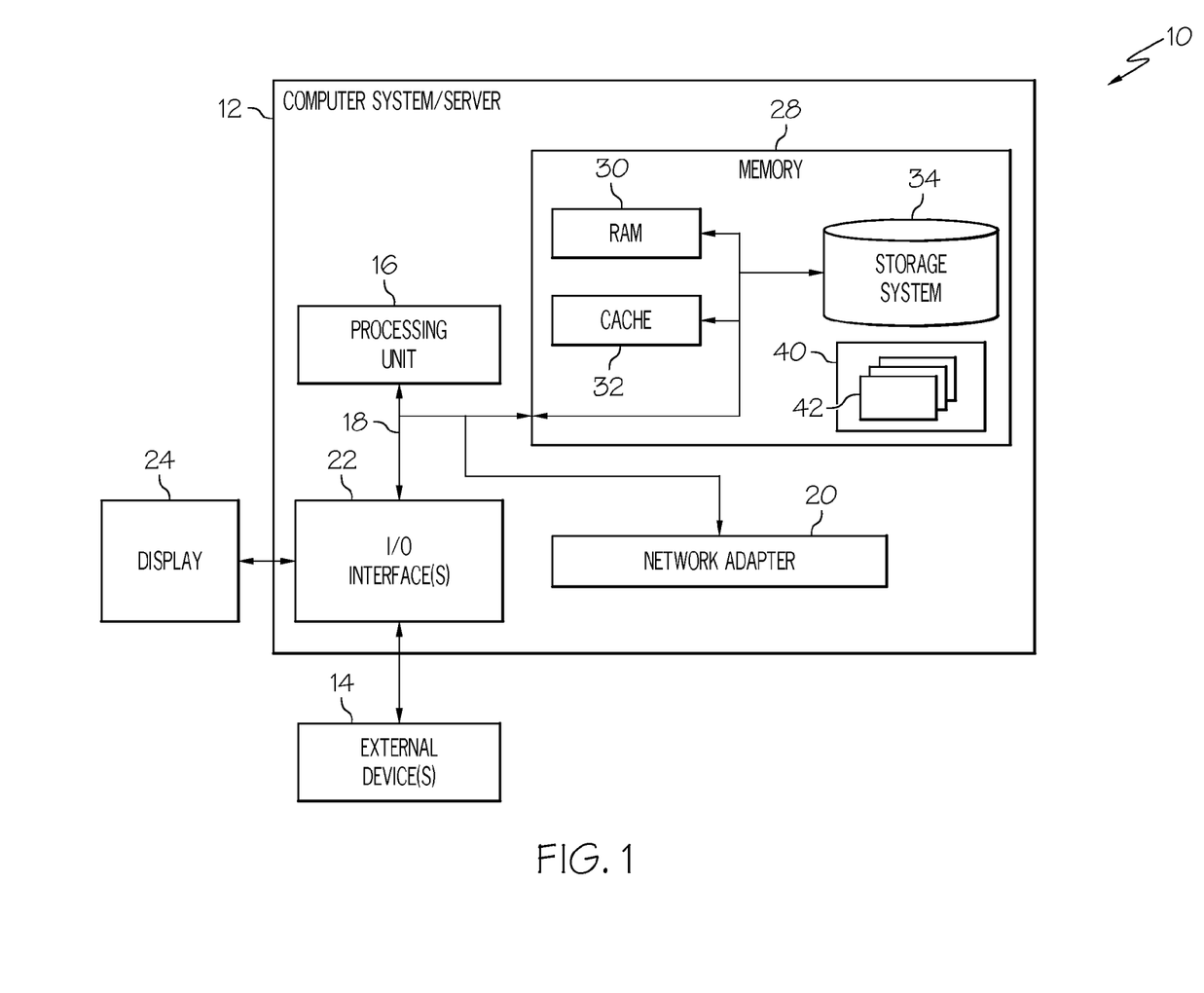
FIG. 1 depicts a cloud computing node according to an embodiment of the present invention.

Referring now to FIG. 1, a schematic of an example is shown of a cloud computing node suitable for embodiments of the present invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/ server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
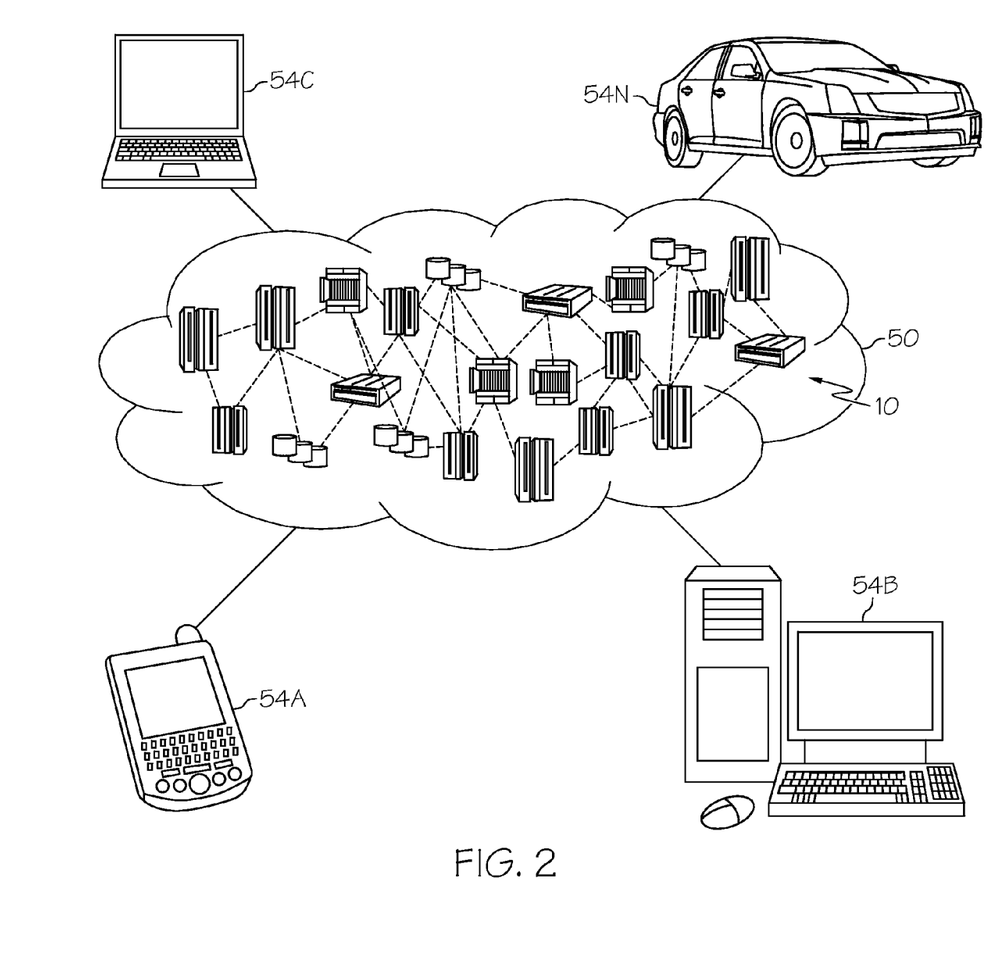
FIG. 2 depicts a cloud computing environment according to an embodiment of the present invention.

FIG. 2 illustrates a cloud computing environment 50 suitable for embodiments of the present invention. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
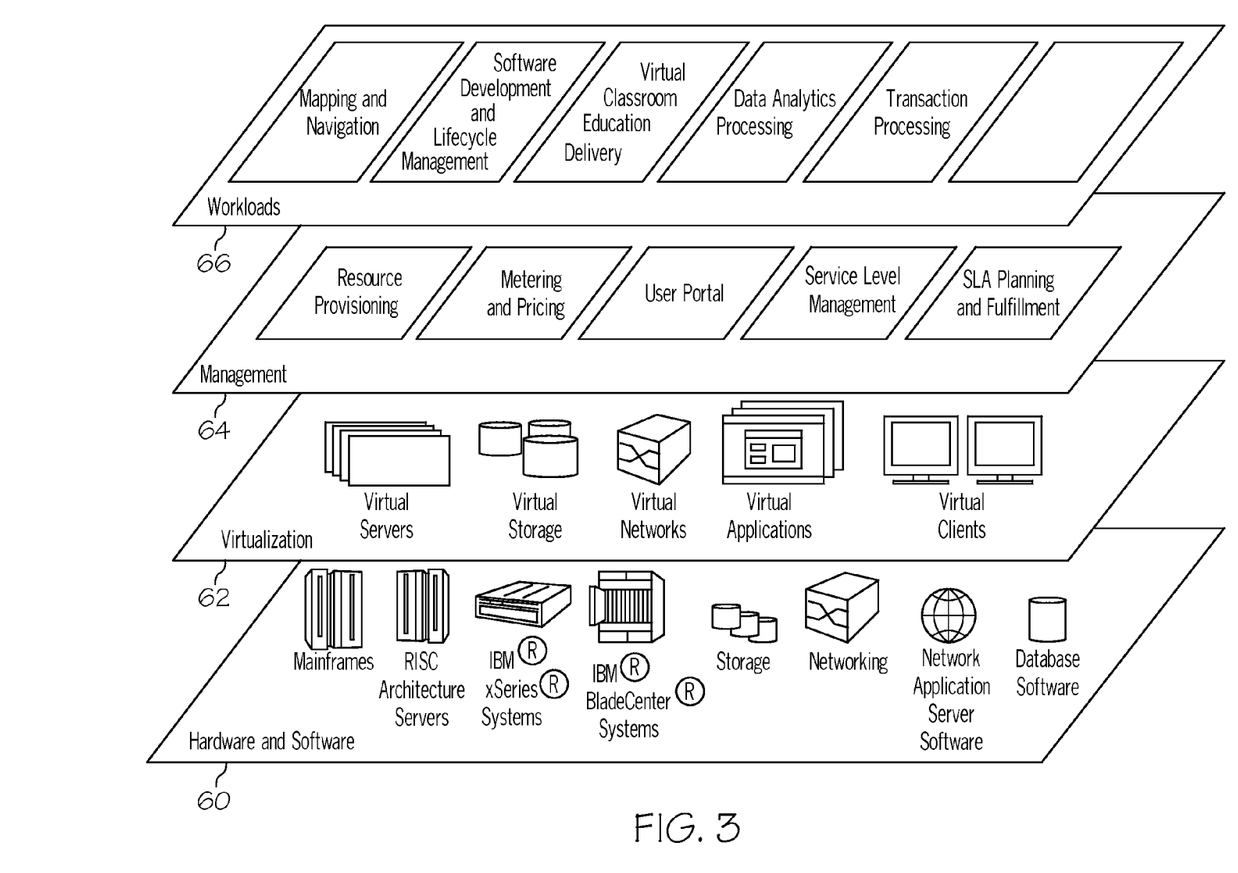
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
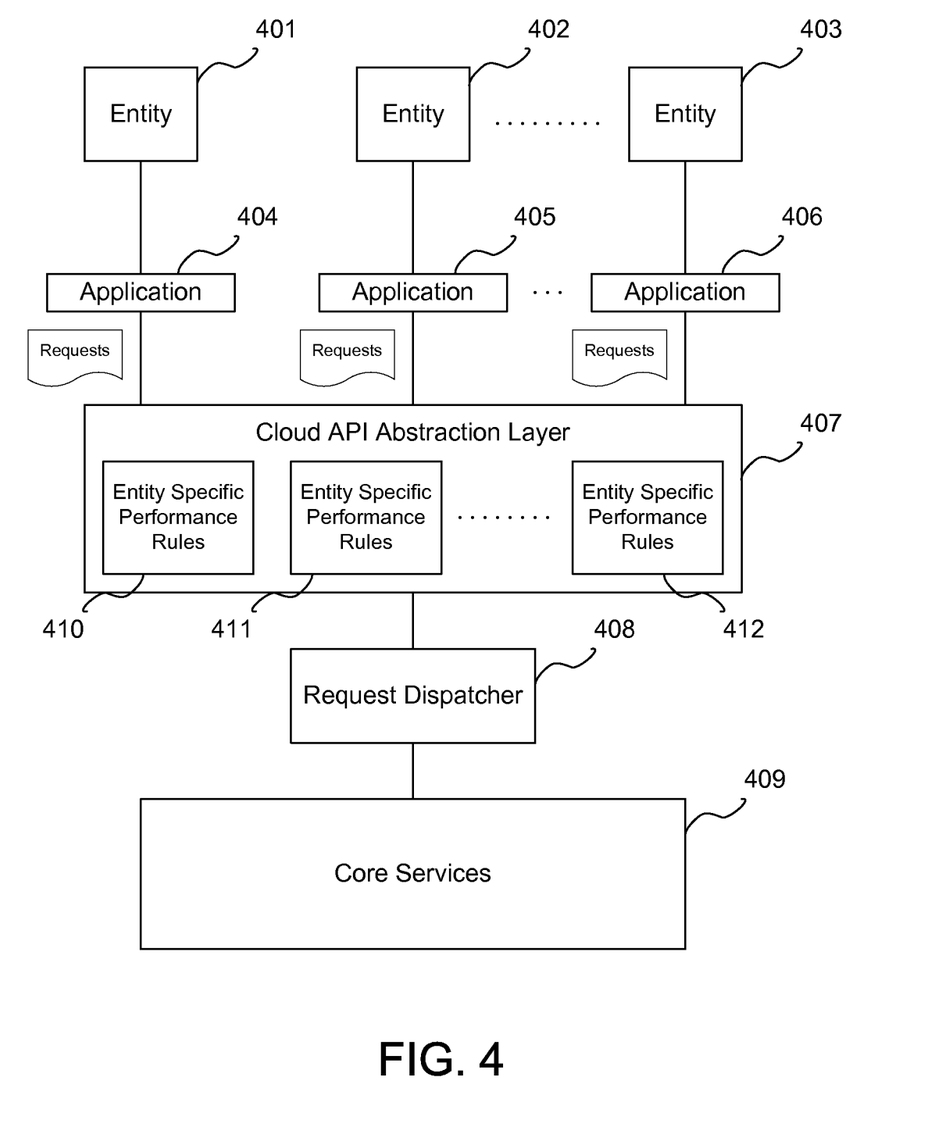
FIG. 4 illustrates a system for enhancing performance of applications according to embodiments of the present invention.

FIG. 4 illustrates a system for enhancing performance of applications according to embodiments of the present invention. The system includes a plurality of entities 401-403, that build applications 404-406 to run "on top" of the cloud computing system or infrastructure. The applications 404-406 send requests to be serviced by core services 409 of the cloud computing system through a cloud application programming interface (API) abstraction layer 407, which in this embodiment, is implemented in the management layer 64 (see FIG. 3). The cloud API abstraction layer 407 includes API's for accessing the core services 409, abstracts the cloud infrastructure for the entities 401-403, and provides security for the underlying cloud computing system. The cloud API abstraction layer 407 processes the requests from the applications 404-406, taking into account entity specific performance rules 410-412, as described further below. In processing the requests, the cloud API abstraction layer 407 considers the capabilities of the underlying components in the hardware and software layer 60 to manage overall performance and load balancing in the cloud computing system. The requests are then scheduled and routed by a request dispatcher 408 for servicing by one or more of the core services 409.

To protect the cloud computing system, the core services 409 cannot be directly accessed by the entities 401-403 or their applications 404-406. Due to this, the entities 401-403 do not have direct control over the scheduling and routing of requests sent from their entity specific applications 404-406, and thus cannot directly control their performances. In this embodiment, the cloud API abstraction layer 407 includes APIs, which the entities 401-403 may call to define performance rules 410-412 specific to themselves that the cloud API abstraction layer 407 will take into account in processing the requests. The cloud API abstraction layer 407 applies the entity specific performance rules 410-412 only to requests from the applications offered by the specific entity. The performance rules of one entity would not be applied to another entity sharing the core services 409. In this manner, the entities 401-403 are given a way to influence the performance of their applications but without given direct access to the core services 409. Further, the security benefits provided by the cloud API abstraction layer 407 are maintained, and the managing of the overall performance and load balancing in the system remains in control of the cloud computing system.

Figure 5:
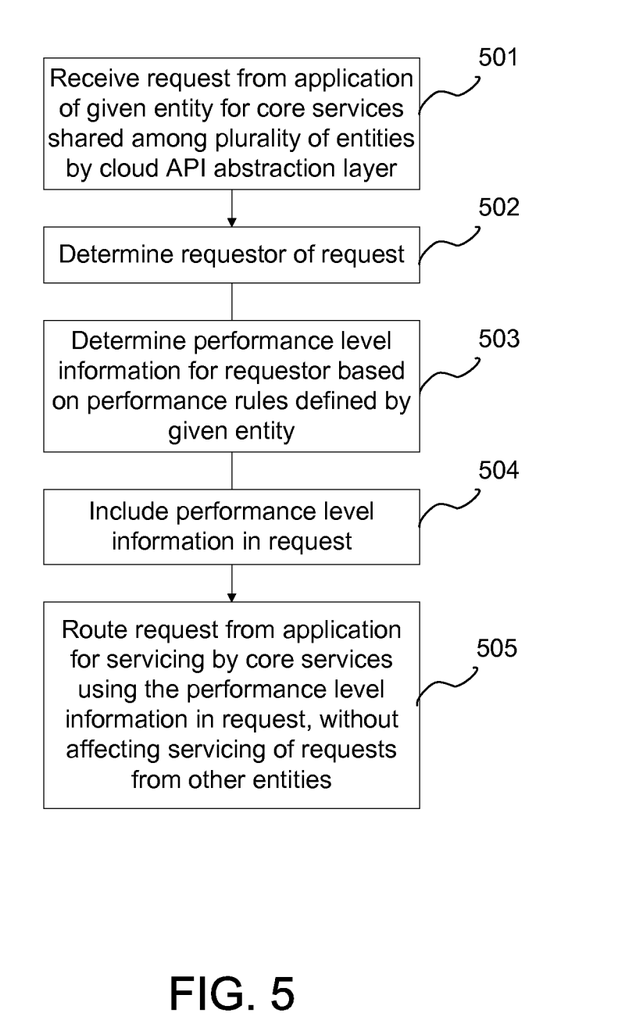
FIG. 5 illustrates a method for enhancing performance of applications according to embodiments of the present invention.

FIG. 5 illustrates a method for enhancing performance of applications according to embodiments of the present invention. In an embodiment, the method is implemented by a computing processor executing programming code as part of the cloud API abstraction layer 407. The cloud API abstraction layer 407 receives one or more requests from an application of a given entity, such as application 406 of entity 403, to be serviced by the core services 409 shared among the plurality of entities 401-403 (501). The cloud API abstraction layer 407 determines the requestor of the request (502), and determines the performance level information for the requestor based on the performance rules 412 specific to the entity 403 (503). This performance level information is then included in the request (504) and forwarded to the request dispatcher 408. Other performance and load balancing rules as defined by the cloud computing system are also applied by the cloud API abstraction layer 407. The request dispatcher 408 routes the request for servicing by one or more of the core services 409 using the performance level information in the request (505). In this manner, the entity 403 is given some influence over the performance of its application 406 on the cloud computing system. Since the entity specific performance rules 412 are applied only the specific entity 403, the servicing of requests from the other entities 401-402 sharing the core services 409 are not affected.

Figure 6:
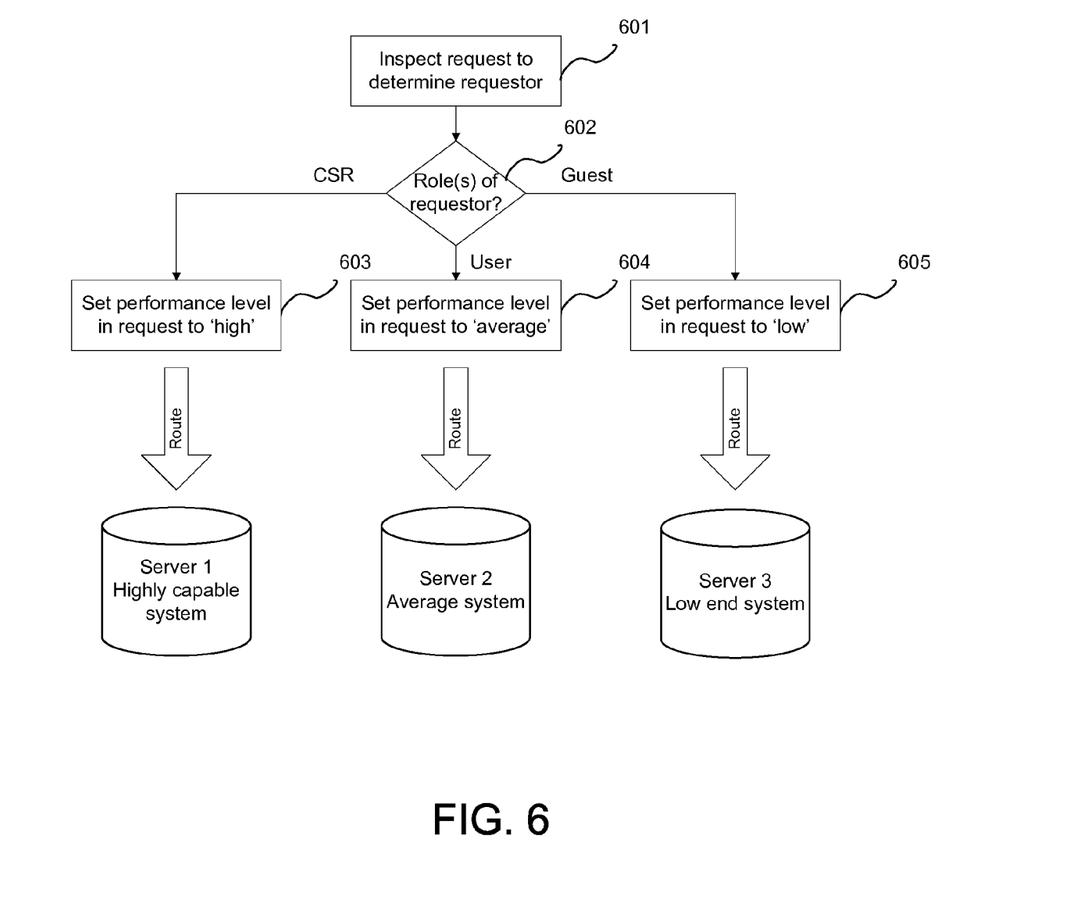
FIGS. 6 and 7 illustrate examples of the method and system for enhancing performance of applications according to embodiments of the present invention.

For example, as illustrated in FIG. 6, the entity specific performance rules 412 may be defined by user roles assigned to requestors that use the application 406. In this example, the rules 412 define a certain performance level for each user role. When the request from the application 406 is received, the cloud API abstraction layer 407 inspects the request to determine the requestor (601). Using the performance rules 412 defined by the entity 403, the cloud API abstraction layer 407 determines the user role for the requestor and the corresponding performance level (602). Assume that the performance rules 412 define a user role of "Customer Service Representative" as having a high performance level, a user role of "User" as having an average performance level, and a user role of "Guest" as having a low performance level. When the user role is determined to be "Customer Service Representative" (CSR), the performance information indicates the request is to be given a "high performance level", and the request dispatcher 408 routes the request to Server 1 (603), a highly capable system. The cloud API abstraction layer 407 sets the performance information in the request with the performance level corresponding to the requestor's user role. The request is then forward to the request dispatcher 408 for routing. When the user role is determined to be "User", the performance information indicates the request is to be given an "average performance level", and the request dispatcher 408 routes the request to Server 2 (604), an average system. When the user role is determined to "Guest", the performance information indicates the request is to be given a "low performance level", and the request dispatcher 408 routes the request to Server 3 (605), a low end system. In this manner, although the entity 403 does not have direct control over the request dispatcher 408 or the core services 409, the entity 403 is nevertheless able to influence the performance of the servicing of the request through its definition of the entity specific performance rules 412.

Figure 7:
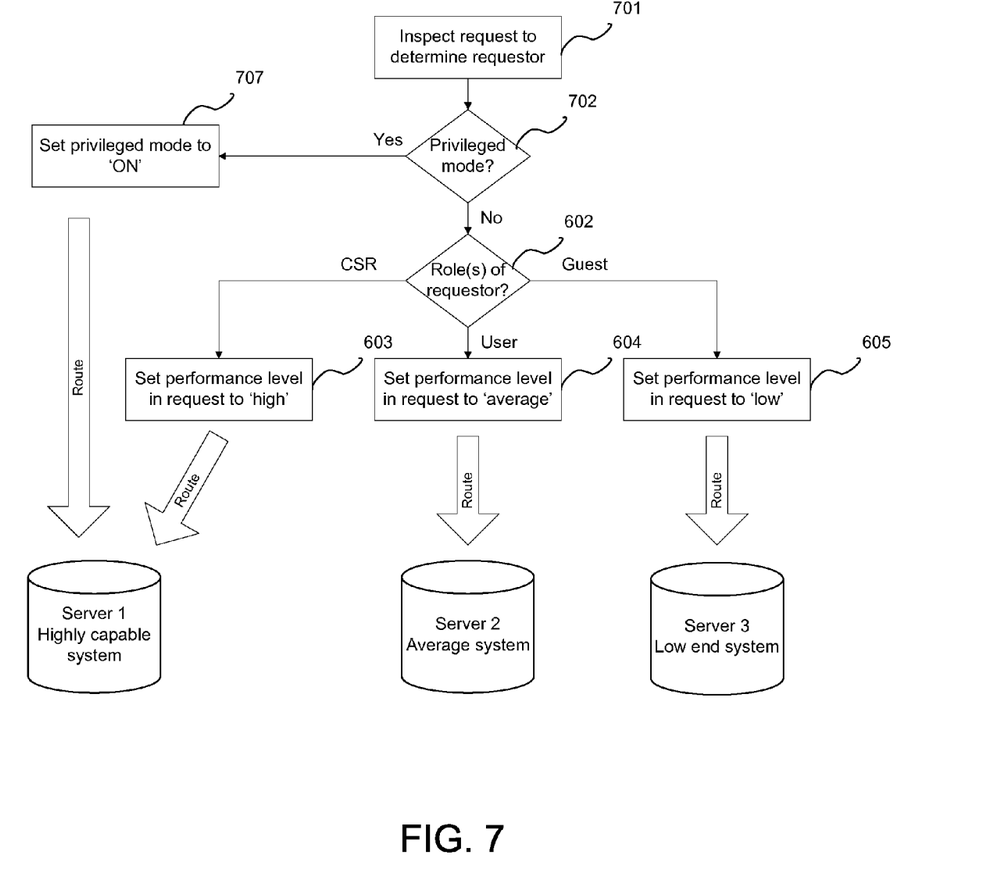

In addition to the user roles, the entity specific performance rules 412 may also define the performance levels based on time. For example, as illustrated in FIG. 7, assume that a user role may not be defined with a high level of performance but may wish to have this level for a limited amount of time. For example, John Doe is giving an important demonstration to a large perspective customer from 2-3 pm. John Doe only holds "User" level performance. However, his employer, entity 403, wants to ensure maximum throughput for this demonstration, as it may yield a large return if John Doe is able to sign this perspective customer. The entity 403 may define the performance rules 412 such that when the requestor is John Doe and the current time is between 2 and 3 pm, John Doe is given a "privileged" performance level. Assume that John Doe signs into the application 406 for use during the demonstration. The application 406 sends a request to be serviced by the core services 409 to the cloud API abstraction layer 407. The cloud API abstraction layer 407 inspects the request to determine that the requestor is John Doe (701) and that the current time is 2:30 pm. The cloud API abstraction layer 407 determines that, according to the performance rules 412, John Doe is to be given a "privileged" performance level (702). In response, the cloud API abstraction layer 407 sets a 'privileged mode' in the request to 'ON' (707) and forwards the request to the request dispatcher 408. After determining that the 'privileged mode' is 'ON', the request dispatcher 408 routes the request to Server 1.

When the cloud API abstraction layer 407 determines that John Doe is not to be given a "privileged" performance level, the user role assigned to John Doe is determined (703). The request is then processed and routed in the manner as set forth above in FIG. 6.

In another example, assume that a company is running a promotion or trying to sign up a specific trial user. The company decides to assign "Guest" level performance for the trial user except during a window of time when a trial user is expected to be contemplating whether to purchase a subscription. The company may define the performance rules such that the privileged mode is 'ON' for requests from the trial user during this critical window of time. The trial user's request is then serviced in the manner set forth in FIG. 7.

In another example, a plurality of requests by a plurality of users of the application 406 is received by the cloud API abstraction layer 407. The cloud API abstraction layer 407 determines the requestor of each request, determines the performance level information for the requestor of each request based on the performance rules defined by entity 403, and includes the performance level information in each request, as set forth above. The plurality of requests is then routed by the request dispatcher 408 in an order consistent with the performance level information in the plurality of requests.

In another example, assume that a plurality of requests by a plurality of users is received from applications offered by the same entity 403. The entity 403 defines its performance rules 412 to include different performance levels for different applications. The cloud API abstraction layer 407 inspects each request to determine the application that sent the request, the requestor, the user role assigned to each requestor, and the performance level assigned to each user role and to each application. The cloud API abstraction layer 407 processes each request accordingly in the manner described above. The request dispatcher 408 then routes each request in an order consistent with the performance levels indicated in the requests.

In the embodiments above, the entities 401-403 are considered "equal", and their requests may be routed by the request dispatcher 408 in a round-robin fashion. Optionally, the entities 401-403 may be given a priority level that influences the performance of their corresponding applications in addition to the ability to define their own entity specific performance rules 410-412. For example, entity 401 may purchase a premium subscription in order to receive higher priority access to the core services 409. The requests received from applications 404-406 offered by the entities 401-403 would thus be processed by the cloud API abstraction layer 407 first according to the priority level of the entity, and then according to the entity specific performance rules 410-412 as set forth above.

For example, assume that entity 403 has a higher priority than entity 401. The cloud API abstraction layer 407 receives requests from applications 404 and 406, corresponding to entities 401 and 403, respectively. Assume that a request from application 404 is determined to have a high performance level according to performance rules 410, and a request from application 406 is determined to have a low performance level according to performance rules 412. In response to those determinations, the cloud API abstraction layer 407 processes the request from application 406 before processing the request for application 404. The requests are processed and routed in the manner set forth above.

The parameters used to determine the performance information in the examples above are for illustrative purposes only. Parameters may be used in various combinations, and other types and combinations of parameters may be used to influence the servicing of requests without departing from the spirit and scope of the present invention.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enhancing performance of applications, comprising:
receiving a request from an application of a given entity by a cloud application programming interface (API) abstraction layer for core services shared among a plurality of entities;
determining a requestor of the request by a computing processor;
determining performance level information for the requestor by the computing processor based on entity specific performance rules defined by the given entity; and
including the performance level information in the request by the computing processor, wherein the request is routed for servicing by one or more of the core services using the performance level information in the request without affecting servicing of requests from other entities of the plurality of entities;
wherein the determining of the performance level information for the request based on the entity specific performance rules defined by the given entity further comprises:
determining a user role assigned to the requestor and a current time; and
determining the performance level assigned to the user role during the current time according to the entity specific performance rules defined by the given entity.

2. The method of claim 1, wherein the entity specific performance rules defined by the given entity are applied to requests from the application of the given entity and are not applied to requests from the other entities of the plurality of entities.

3. The method of claim 1, wherein each entity of the plurality of entities is associated with a priority level, wherein the method further comprises:
determining that the given entity is associated with a higher priority than another entity of the plurality of entities; and
processing the request from the application of the given entity before processing any requests from the other entity.

4. The method of claim 1, further comprising:
receiving a plurality of requests from a plurality of users of the application of the given entity;
determining the requestor of each request;
determining the performance level information for the requestor of each request based on the entity specific performance rules defined by the given entity; and including the performance level information for the requestor in each request, wherein the plurality of requests is routed for servicing by one or more of the core services in an order consistent with the performance level information in the plurality of requests, without affecting servicing of requests from other entities of the plurality of entities.

5. The method of claim 1, further comprising:

receiving a plurality of requests from a plurality of users of a plurality of applications of the given entity;

determining the requestor and the application of each request;

determining the performance level information for the requestor and the application of each request based on the entity specific performance rules defined by the given entity; and including the performance level information for the requestor and the application in each request, wherein the plurality of requests is routed for servicing by one or more of the core services in an order consistent with the performance level information in the plurality of requests, without affecting servicing of requests from other entities of the plurality of entities.

* * * * *